United States Patent [19]

Sato et al.

[11] Patent Number: 4,864,024
[45] Date of Patent: Sep. 5, 1989

[54] LEUCO DYES

[75] Inventors: Kozo Sato; Toru Harada, both of Kanagawa, Japan

[73] Assignee: Fuji Photo Film Co., Ltd., Kanagawa, Japan

[21] Appl. No.: 154,548

[22] Filed: Feb. 10, 1988

[30] Foreign Application Priority Data

Feb. 13, 1987 [JP] Japan .................. 62-30972

[51] Int. Cl.⁴ ........................... C07D 491/048
[52] U.S. Cl. ........................... 544/35; 544/31; 544/38; 544/73; 544/99; 544/102; 544/347
[58] Field of Search ............... 544/31, 35, 38, 73, 544/99, 102, 347

[56] References Cited

U.S. PATENT DOCUMENTS 4,710,570 12/1987 Thien ................... 544/31

Primary Examiner—Richard L. Raymond
Attorney, Agent, or Firm—Sughrue, Mion, Zinn, Macpeak & Seas

[57] ABSTRACT

A new leuco dye is capable of developing into a colored dye which has an absorption band in the near infrared region. The new leuco dye has the following formula (I):

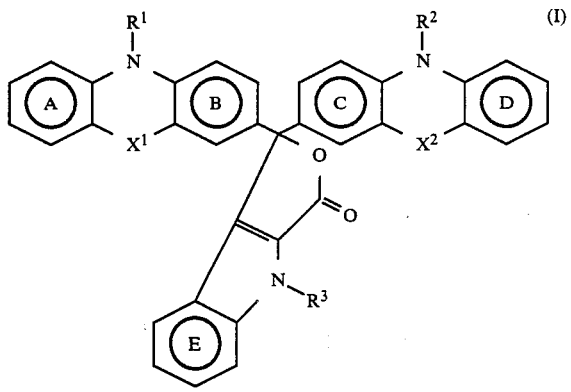

wherein each of $R^1$, $R^2$ and $R^3$ independently is hydrogen, an alkyl group, an aralkyl group, a cycloalkyl group or an aryl group; each of $X^1$ and $X^2$ independently is oxygen, sulfur or $-NR^4-$ ($R^4$ has the same meaning as for $R^1$, $R^2$ and $R^3$); each of the rings A to E independently is benzene ring or naphthalene ring and may have one or more substituent groups; and each of $R^1$ to $R^4$ may have one or more substituent groups. A recording material containing the leuco dye is also disclosed.

4 Claims, 1 Drawing Sheet

LEUCO DYES

BACKGROUND OF THE INVENTION

Field of the Invention

The present invention relates to a leuco dye appropriately employable for recording materials such as pressure-sensitive paper, heat-sensitive paper, etc., and more particularly to a novel leuco dye which is capable of developing into a colored dye having an absorption band in the near infrared region. The formed dye gives a color image which can be read out using an optical character reader (OCR). The present invention further relates a recording material containing the leuco dye.

Description of prior art

Recording materials containing a leuco dye have been known for a long time. Recently, the recording materials are frequently used as pressure-sensitive papers or heat-sensitive papers.

The pressure-sensitive recording material generally utilizes a chemical reaction between a leuco dye, which is substantially colorless, and a developer which develops the leuco dye to form a color image in the region where the developer is in contact with the leuco dye. A typical example of the pressure-sensitive paper comprises a combination of a color former sheet and a developer sheet. The color former sheet is prepared by encapsulating an organic solvent solution of a leuco dye to produce microcapsules and coating the resulting microcapsules on a sheet. The developer sheet is prepared by coating a developer with an adhesive on a sheet. In the pressure-sensitive paper, the coated layers of the two sheets are placed to face each other. A color image can be obtained on the developer sheet by writing characters under pressure on the side of the color former sheet to rupture the microcapsules.

The heat-sensitive recording material containing a leuco dye comprises a leuco dye and a developer provided on a support. A color image can be obtained by heating the material using a heating element (e.g., thermal head) to give a thermal image signal to the material.

Typical examples of the leuco dye which have been conventionally used in the recording material include blue dyes such as Crystal Violet Lactone and black dyes such as 7-anilino-fluorans.

In recent years, an optical character reader (OCR) and a label bar cord reader have been used for reading the recording material. In these read-out devices, a luminous diode or a semiconductor laser which emits light having a wavelength of not less than 700 nm is generally used as a light source. However, the above-mentioned blue dyes and black dyes scarcely absorb light in the near infrared region (not shorter than 700 nm) so that the developed color image can not be read out by the above-mentioned read-out devices. Therefore, it is highly demanded to provide a leuco dye which is capable of developing to form a colored dye that absorbs light having a wavelength of not shorter than 700 nm.

Some leuco dyes are capable of developing to give a colored dye which absorbs light having a long wavelength, as described in Japanese Patent Provisional Publications No. 51(1976)-121035 (corresponding to British Patent No. 1496296), No. 57(1982)-167979 (corresponding to European Patent No. 62544), No. 59(1984)-199757 and No. 60(1985)-231766. However, these dyes have such a disadvantage that absorption wavelength is not proper or light resistance is low.

SUMMARY OF THE INVENTION

It is an object of the present invention to provide a novel leuco dye which is capable of developing into a colored dye having an intense absorption band in the near infrared region (not less than 700 nm) and high resistance (i.e., fastness) to light.

It is another object of the present invention to provide a recording material which is suitable for use with an image read-out device employing a readily available light source, such as semiconductor laser.

Accordingly, the present invention provides a leuco dye having the following formula (I):

wherein each of $R^1$, $R^2$ and $R^3$ independently is a monovalent group selected from the group consisting of hydrogen, an alkyl group, an aralkyl group, a cycloalkyl group and an aryl group; each of $X^1$ and $X^2$ independently is a divalent group selected from the group consisting of oxygen, sulfur and $-NR^4-$ ($R^4$ has the same meanings as for $R^1$, $R^2$ and $R^3$); and each of the rings A to E independently is benzene ring or naphthalene ring and may have one or more substituent groups; and each of $R^1$ to $R^4$ may have one or more substituent groups.

Further, the present invention provides a recording material containing a leuco dye having the formula (I).

The leuco dye having the formula (I) is capable of developing into a colored dye showing high absorption intensity in the near infrared region. Further, the leuco dye is superior to conventional leuco dyes with respect to the light fastness of the formed dye having an absorption band in the near infrared region. A recording material containing the leuco dye of the present invention has a great practical value, since the read-out operation of a formed image can be carried out using a general-purpose image read-out device having a light source in the near infrared region, such as semiconductor laser.

DETAILED DESCRIPTION OF THE INVENTION

The leuco dye of the present invention has the following formula (I).

In the formula (I), each of $R^1$, $R^2$ and $R^3$ independently is a monovalent group selected from the group consisting of hydrogen, an alkyl group, an aralkyl group, a cycloalkyl group and an aryl group. Each of $X^1$ and $X^2$ independently is a divalent group selected from the group consisting of oxygen, sulfur and —$NR^4$—, wherein $R^4$ is a monovalent group selected from the group consisting of hydrogen, an alkyl group, an aralkyl group, a cycloalkyl group and an aryl group. Each of the rings A to E independently is benzene ring or naphthalene ring, each of which may have one or more substituent groups. Each of $R^1$ to $R^4$ may have one or more substituent groups.

In the formula (I), the alkyl group for $R^1$ to $R^4$ may be a straight chain or branched chain. The alkyl group preferably has 1 to 22 carbon atoms. The alkyl group may have one or more substituent groups such as halogen, cyano, hydroxyl and an alkoxy group.

Examples of the aralkyl group for $R^1$ to $R^4$ include benzyl and β-phenethyl. The aryl moiety of the aralkyl group may have one or more substituent groups such as halogen, nitro, cyano, a lower alkyl group having 1 to 4 carbon atoms and a lower alkoxy group having 1 to 4 carbon atoms.

Examples of the cycloalkyl group for $R^1$ to $R^4$ include cyclohexyl, cyclopentyl and 4-methylcyclohexyl.

Examples of the aryl group for $R^1$ to $R^4$ include phenyl, p-tolyl, p-chlorophenyl, p-methoxyphenyl, α-naphthyl and β-naphthyl.

In the formula (I), each of $X^1$ and $X^2$ independently is selected from the group consisting of oxygen, sulfur and —$NR^4$—, in consideration of the wavelength to be absorbed and fastness to light. For instance, sulfur is preferably selected when a light of a relatively long wavelength is to be absorbed, while oxygen or —$NR^4$— is preferably selected when high fastness to light is required. In consideration of synthesis of the leuco dye, $X^1$ and $X^2$ preferably are same divalent group.

Each of rings A to E independently is benzene ring or naphthalene ring. Each of the rings B, C and E preferably is benzene ring. Each of rings A to E may have one or more substituent groups such as an alkyl group, an alkoxy group, halogen, hydroxyl group, an acyloxy group, an acylamino group, sulfonamide group, a dialkylamino group and an arylamino group.

Typical examples of the leuco dye of the present invention are described hereinafter.

-continued

-continued

-continued (12)

(13)

(14)

-continued (15)

(16)

(17)

-continued (18)

The leuco dye of the present invention can be synthesized according to the following reaction scheme.

Synthesis Example of Leuco dye (2)

The process of synthesis of the leuco dye is further described hereinafter.

Synthesis of Compound (a)

To 2 l of dimethyl sulfoxide were added 224 g of potassium hydroxide and 199 g of phenothiazine, and the mixture was stirred at room temperature for 30 minutes. To the resulting mixture was dropwise added 441 g of n-butyl bromide over a period of one hour and the mixture was stirred at room temperature for three hours. Extraction was then carried out using 1 l of water and 500 ml of ethyl acetate. The extract was concentrated under reduced pressure and the residue was distilled under reduced pressure (yield: 244.5 g, melting point: 173°–4° C./0.5–1 mmHg).

Synthesis of Compound (b)

To 102 g of Compound (a) in 200 ml of o-dichlorobenzene was added 40 g of aluminum chloride. Phosgene gas was passed through the mixture over a period of one hour. The mixture was then stirred at 80° C. for two hours and poured into ice water. Extraction was carried out using chloroform and steam distillation was conducted to remove o-dichlorobenzene. The product was extracted with ethyl acetate and then purified by column chromatography (yield: 51 g).

Synthesis of Compound (c) and Leuco dye (2)

To 11 g of Compound (b) in 120 ml of toluene was added 7 g of 70 % toluene solution of sodium dihydrobis(2-methoxyethoxy)-aluminate (trade name: Vitride) while stirring at room temperature, and the mixture was further stirred for one hour. The reaction mixture was poured into water and extraction was conducted. The extract was concentrated under reduced pressure. To the concentrate were added 50 ml of acetic acid and 6.7 g of 1-methylindole-2-carboxylic acid, and the mixture was stirred at a temperature of 60 to 70° C. for two hours and poured into water. Extraction was carried out using ethyl acetate. To the ethyl acetate portion was added 20 g of lead dioxide. The mixture was stirred at room temperature and filtered. The filtrate was then concentrated under reduced pressure. The residue was purified by column chromatography to obtain Leuco dye (2) in the form of light green crystals (yield: 7.2 g, melting point: 119°–125° C.).

Other leuco dyes can be synthesized in a similar manner to that described above. The leuco dyes having the formula (I) are colorless or pale.

The leuco dyes of the present invention have the above-mentioned excellent characteristics. Particularly, the leuco dyes of the present invention exhibit a very excellent effect, when they are used in various recording materials utilizing a color forming reaction of the dye with an electron acceptor (hereinafter referred to as developer).

Examples of the developer include acid clay developers (e.g., China clay), phenol-formaldehyde resins (e.g., p-phenylphenol-formaldehyde resin), metal salts of salicylic acid (e.g., zinc 3,5-di-α-methylbenzylsalicylate), phenol-salicylic acid-formaldehyde resins (e.g., p-octylphenol-zinc salicylate-formaldehyde resin), zinc rhodanize, zinc xanthate and compounds having active hydrogen such as phenols, pyrazolones and sulfonamides.

The leuco dye of the present invention can be used as a color former in various recording materials such as pressure-sensitive recording materials, heat-sensitive recording materials (thermal recoding materials) and thermal transfer recording materials, in the same manner as those for conventional leuco dyes.

For instance, the pressure-sensitive recording material containing the leuco dye can be prepared in the following manner. First, the leuco dye dissolved in an organic solvent, and the resulting solution is encapsulated to prepare microcapsules. For example, the microcapsules can be prepared by a process described in U.S. Patent No. 2,800,457. According to the process, the leuco dye is dissolved in di-isopropylnaphthalene or terphenyl oil to prepare 1 to 10 % solution, and the solution is encapsulated with a shell material of gelatin or a resin such as a melamine-formaldehyde resin. Generally, the particle diameter of the microcapsule is about 5 $\mu$m. A support such as a paper sheet or a plastic film is coated with the microcapsules using a binder to obtain a color former sheet. The color former sheet is placed on a developer sheet which has a layer containing a developer (electron-acceptor). When characters are written on the side of the color former sheet to rupture the microcapsules, the leuco dye is brought into contact with the developer. A developed color image is thus obtained on the developer sheet.

The heat-sensitive recording material can be prepared in the following manner. Each of the leuco dye, and developer (electron acceptor) and auxiliary ingredients such as a filler is dispersed in an aqueous medium. The resulting dispersions are mixed. A support is coated with the mixed dispersion and dried. The particle diameter of the leuco dye is preferably 0.1 to 5 $\mu$m. The resulting heat-sensitive recording material is heated using a thermal head to bring the leuco dye into contact with the developer in the melting state. A color image is thus obtained on the recording material.

The thermal transfer recording material can be prepared in the following manner. The leuco dye is provided on a support in a similar manner to the above-mentioned manner to prepare a thermal transfer sheet. The developer is provided on another support in the similar manner to prepare a receiving sheet. The transfer sheet is placed on the receiving sheet. When the transfer sheet is heated, a color image is obtained on the receiving sheet.

The leuco dyes of the present invention can be used in various fields in which conventional leuco dyes have been used. The leuco dyes of the present invention are particularly suitable for use as color formers in the recording materials which are read out in optical character reader or label bar cord reader, since the leuco dyes of the invention show excellent absorption in the near infrared region.

When the leuco dye of present invention is used in a thermal recording label sheet, the sheet can be prepared by arranging a heat-sensitive color former layer containing the leuco dye of the present invention and a developer on one side of a support and arranging an adhesive layer and a release layer on the other side of the support. If desired, a protective layer such as a water-soluble resin layer can be provided on the surface of the heat-sensitive color former layer to increase stability of an obtained image.

The present invention is further described by the following examples without limiting the invention. In the following examples, "part(s)" means a value by weight unless otherwise stated.

EXAMPLE 1

Preparation of color former sheet

To 95 parts of hot water at about 80° C. were added 5 parts of partial sodium salt of polyvinylbenzenesulfonic acid (trade name: VERSA TL500, average molecular weight: 500,000, produced by National Starch) while stirring. The sodium salt was dissolved over a period of about 30 minutes and the resulting aqueous solution was cooled. The aqueous solution had a pH value in the range of 2 to 3. The pH value was adjusted to 4.0 by adding 20 weight % aqueous solution of sodium hydroxide.

In 100 parts of 5 % aqueous solution of the obtained partial sodium salt of polyvinylbenzenesulfonic acid were emulsified 100 parts of 3.5 % diisopropylnaphthalene solution of the following leuco dye (1) (color former) to obtain an emulsion having an average oil droplet size of 4.5 $\mu$m.

(Leuco dye (1))

Separately, 6 parts of melamine, 11 parts of 37 weight % aqueous solution of formaldehyde and 30 parts of water were heated under stirring. After 30 minutes, a clear aqueous solution of a mixture of melamine, formaldehyde and a melamine-formaldehyde precondensate (hereinafter referred to as precondensate solution) was obtained. The aqueous solution of the mixture had a pH value in the range of 6 to 8.

The obtained precondensate solution was added to the above-prepared emulsion. The pH value of the mixture was adjusted to 6.0 by adding 3.6 weight % aqueous solution of phosphoric acid while stirring. The mixture was stirred at 65° C. for six hours to prepare a microcapsule dispersion. The microcapsule dispersion was cooled to room temperature and the pH value was adjusted to 9.0 by adding 20 weight % aqueous solution of sodium hydroxide.

To the microcapsule dispersion were added 200 parts of 10 weight % aqueous solution of polyvinyl alcohol (trade name: PVA-117, produced by Kuraray Co., Ltd.) and 50 parts of starch particles. Water was then added to the resulting dispersion in such an amount as to give a solid content of 20 %, to prepare a coating solution. The coating solution was coated on a base paper of 50 g/m² in a coating amount of 5 g/m² (on a solid material basis) by means of an air-knife coater and then dried to obtain a color former sheet in which the leuco dye (color former) was contained in microcapsules.

Preparation of developer sheet

To 20 parts of 1-isopropylphenyl-2-phenylethane were added 10 parts of zinc 3,5-bis-α-methylbenzylsalicylate, and the mixture was heated at 90° C. to obtain a solution. The solution was added to 2 weight % aqueous solution of polyvinyl alcohol (PVA-117, produced by Kuraray Co., Ltd.). Further, 0.1 part of 10 % aqueous solution of triethanol amine salt of dodecylbenzenesulfonic acid (surfactant) was added to the mixture. The resulting mixture was emulsified using a homogenizer to prepare an emulsion having an average oil droplet size of 3 μm.

In 200 parts of water were dispersed 80 parts of calcium carbonate, 20 parts of zinc oxide and 1 part of sodium hexametaphosphate in a mill to prepare a dispersion. The dispersion was mixed with the above-prepared emulsion. To the mixture were added 100 parts of 10 weight % aqueous solution of polyvinyl alcohol (PVA-117, produced by Kuraray Co. Ltd.) as a binder and 10 parts (solid content) of carboxyl-modified SBR latex (trade name: SN-307, produced by Sumitomo Naugatax Co., Ltd.). Water was then added to the resulting mixture in such an amount as to give a solid content of 20 % to prepare a coating solution (A).

Separately, in 200 parts of water were added 15 parts of zinc 3,5-bis-α-methylbenzylsalicylate, 20 parts of silton clay, 60 parts of calcium carbonate, 20 parts of zinc oxide and 1 part of sodium hexametaphosphate. The resulting mixture was dispersed in a sand grinder to prepare a dispersion having an average particle size of 3 μm.

To the resulting dispersion was added 16 parts of 10 weight % aqueous solution of polyvinyl alcohol (PVA-103, produced by Kuraray Co. Ltd.). To the mixture were further added 100 parts of 10 weight % aqueous solution of polyvinyl alcohol (PVA-117, produced by Kuraray Co., Ltd.) and 10 parts (solid content) of a carboxyl-modified SBR latex (SN-307, produced by Sumitomo Naugatax Co., Ltd.). Water was then added to the resulting mixture in such an amount as to give a solid content of 20 % to prepare a coating solution (B).

The coating solution (A) was mixed with the coating solution (B) in a ratio of A/B =50/50 (in terms of the amount of the developer). The mixed solution was coated on a base paper of 50 g/m² in a coating amount of 5.0 g/m² on a solid material basis by means of an air-knife coater and then dried to prepare a developer sheet.

Preparation of pressure-sensitive recording sheet

The developer sheet was combined with the color former sheet to prepare a pressure-sensitive recording sheet (I).

EXAMPLES 2 & 3

Preparation of pressure-sensitive recording sheet

Pressure-sensitive recording sheets (II) and (III) were prepared in the same manner as in Example 1 except that the following leuco dyes (2) and (3) were respectively used in place of the leuco dye (1) in the preparation of the color former sheet.

(Leuco dye (2))

-continued (Leuco dye (3))

COMPARISON EXAMPLES 1 & 2

Preparation of pressure-sensitive recording sheet

Pressure-sensitive recording sheets (IV) and (V) were prepared in the same manner as in Example 1 except that Crystal Violet Lactone (CVL) and 3-diethylamino-6-methyl-7-anilinofluoran (herinafter referred to as AF) were respectively used in place of the leuco dye (1) in the preparation of the color former sheet.

Evaluation of pressure-sensitive recording sheet

Figure 1:
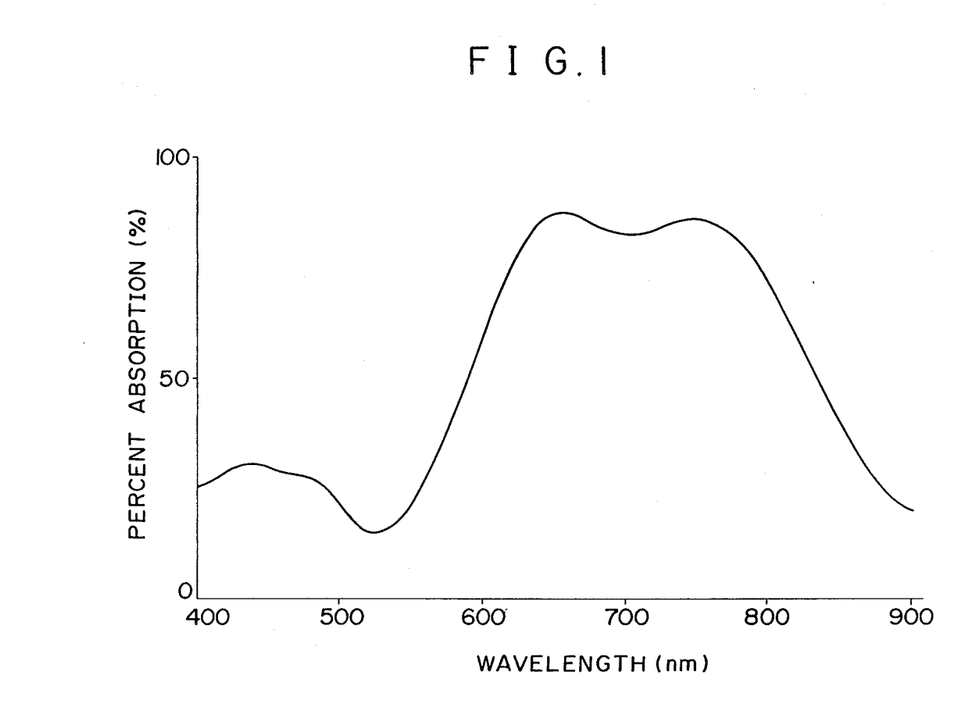
FIG. 1 is a graph showing an absorption spectrum of a colored image which is obtained using a leuco dye of the present invention.

Each of the pressure-sensitive recording sheets (I) to (V) was pressed to obtain a color image corresponding to each of the color former. Each of the obtained images had a high optical density. The range of absorption wavelength ($\lambda_{max}$ : peak of absorption wavelength) in absorption spectrum and the color tone were measured for each of the obtained images. The results are set forth in Table 1. FIG. 1 shows the absorption spectrum of the image which has been obtained from the pressure-sensitive recording sheet (I).

TABLE 1

| Pressure-sensitive Recording Sheet | Leuco Dye | Hue of Developed Color | Range of Absorption Wavelength (nm) |
|---|---|---|---|
| Example 1 (I) | (1) | Dark Green | 600–900 ($\lambda_{max}$; 655, 760) |
| Example 2 (II) | (2) | Dark Green | 600–900 ($\lambda_{max}$; 655, 760) |
| Example 3 (III) | (3) | Bluish Green | 550–860 ($\lambda_{max}$; 655, 760) |
| Comp. Ex. 1 (IV) | (CLV) | Blue | 550–640 ($\lambda_{max}$; 610) |
| Comp. Ex. 2 (V) | (AF) | Black | 400–650 ($\lambda_{max}$; 460, 570) |

It is apparent from the results in Table 1 that color images obtained on the pressure-sensitive recording sheets (I), (II) and (III) containing the leuco dye of the present invention intensively absorb light in the near infrared region (wavelength: not shorter than 700 nm), while color images obtained from the sheets (IV) and (V) scarcely absorb light in the near infrared region.

FIG. 1 is a graph showing an absorption spectrum of the color image obtained from the pressure-sensitive recording sheet (I) which was prepared using the leuco dye (1) of the present invention (Example 1). In the FIG. 1, $\lambda_{max}$ is the exact value. It is apparent from the results in FIG. 1 that the leuco dye (1) of the present invention shows absorption peaks in the near infrared region. The percent absorpsion at both peaks (750.0 nm and 758.8 nm) is 86 %.

EXAMPLE 4

Preparation of heat-sensitive recording material

Each of the mixtures having the following composition was dispersed in a ball mill to prepare each of the Liquids A to D.

| Liquid A | |
|---|---|
| Leuco dye (1) | 10 parts |
| 10% Aqueous solution of hydroxyethyl cellulose | 10 parts |
| Water | 55 parts |
| Liquid B | |
| Stearamide | 20 parts |
| 5% Aqueous solution of methyl cellusole | 20 parts |
| Dispersing agent | 2 parts |
| Water | 60 parts |
| Liquid C | |
| Calcium carbonate | 30 parts |
| 5% Aqueous solution of methyl cellulose | 30 parts |
| Dispersing agent | 2 parts |
| Water | 60 parts |
| Liquid D | |
| Activated clay | 30 parts |
| Urea-formalin resin filler | 10 parts |
| 10% Aqueous solution of polyvinyl alcohol | 20 parts |
| Water | 140 parts |

The liquids A, B and C were mixed in a ratio of 1:1:1 by weight to prepare a coating solution. The coating solution was coated on a wood free paper having a basis weight of 50 g/m² in a coating amount of 0.45 g/m² based on the dry solid content of the dye, and then dried. The liquid D was then coated on the layer in a coating amount of 2 g/m² based on the dry solid content to prepare a heat-sensitive recording material (VI).

EXAMPLE 5

Preparation of heat-sensitive recording sheet

A heat-sensitive recording sheet (VII) was prepared in the same manner as in Example 4 except that the leuco dye (3) used in Example 3 was used in place of the leuco dye (1) in the preparation of Liquid A.

COMPARISON EXAMPLE 3

Preparation of heat-sensitive recording sheet

A heat-sensitive recording sheet (VIII) was prepared in the same manner as in Example 4 except that the following leuco dye (x) (which is described in Japanese Patent Provisional Publication No. 59(1984)-199757) was used in place of the leuco dye (1) in the preparation of Liquid A.

(Leuco dye (x))

Evaluation of heat-sensitive recording material

Each of the heat-sensitive recording materials (VI), (VII) and (VIII) was pressed at pressure of 4 kg/cm² at 125° C. for 5 seconds to obtain a color image by development. Each of the recording materials on which a color image had been formed was evaluated by measuring light resistance of the color image and the region of the absorption wavelength in absorption spectrum of the color image.

The light resistance was evaluated by irradiating each material with light having an illuminance of 80,000 lx by an xenon lamp, measuring the optical density of the color image and comparing the optical density after irradiation with that before irradiation. The light resistance was indicated by a ratio of remainder (%).

The results are set forth in Table 2.

TABLE 2

| Heat-sensitive Recording Sheet | Leuco Dye | Range of Absorption Wavelength (nm) | Light Resistance (%) |
|---|---|---|---|
| Example 4 (VI) | (1) | 600–900 ($\lambda_{max}$; 655, 760) | 65 |
| Example 5 (VII) | (3) | 550–860 ($\lambda_{max}$; 630, 745) | 80 |
| Comp. Ex. 3 (VIII) | (x) | 550–950 ($\lambda_{max}$; 650, 850) | 28 |

It is apparent from the results in Table 2 that color images obtained on the pressure-sensitive recording materials (VI) and (VII) containing the leuco dye of the present invention are superior in light resistance to the color image obtained from the recording material (VIII) containing a conventional leuco dye.

We claim:

1. A leuco dye having the following formula (I):

wherein each of $R^1$, $R^2$ and $R^3$ independently is a monovalent group selected from the group consisting of hydrogen, an alkyl group, an aralkyl group, a cycloalkyl group and an aryl group; each of $X^1$ and $X^2$ independently is a divalent group selected from the group consisting of oxygen, sulfur and $-NR^4-$, wherein $R^4$ is a monovalent group selected from the group consisting of hydrogen, an alkyl group, an aralkyl group, a cycloalkyl group and an aryl group; each of the rings A to E independently is benzene ring or naphthalene ring, each of which may have one or more substituent groups and each of $R^1$ to $R^4$ may have one or more substituent groups.

2. The leuco dye claimed in claim 1, wherein each of $R^1$, $R^2$ and $R^3$ independently is a monovalent group containing 1–22 carbon atoms.

3. The leuco dye claimed in claim 1, wherein $X^1$ and $X^2$ are the same divalent group.

4. The leuco dye claimed in claim 1, wherein each of the rings B, C and E is benzene ring.

* * * * *